United States Patent
Sumita et al.

(10) Patent No.: US 10,142,510 B2
(45) Date of Patent: Nov. 27, 2018

(54) PRINT CONTROL APPARATUS AND CONTROL METHOD THEREOF

(71) Applicant: CANON KABUSHIKI KAISHA, Tokyo (JP)

(72) Inventors: Chisei Sumita, Tokyo (JP); Takao Aichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/206,539

(22) Filed: Jul. 11, 2016

(65) Prior Publication Data

US 2016/0323477 A1    Nov. 3, 2016

Related U.S. Application Data

(63) Continuation of application No. 13/779,910, filed on Feb. 28, 2013, now Pat. No. 9,426,321.

(30) Foreign Application Priority Data

Mar. 5, 2012    (JP) .................................. 2012-048617

(51) Int. Cl.
*G06F 3/12*    (2006.01)
*H04N 1/32*    (2006.01)
(Continued)

(52) U.S. Cl.
CPC ............ *H04N 1/32* (2013.01); *H04N 1/0097* (2013.01); *H04N 1/00127* (2013.01); *H04N 1/00307* (2013.01); *H04N 1/00408* (2013.01); *H04N 1/00482* (2013.01); *H04N 1/32797* (2013.01); *H04N 1/00204* (2013.01); *H04N 2201/006* (2013.01); *H04N 2201/0055* (2013.01);
(Continued)

(58) Field of Classification Search
CPC ........... H04N 1/00127; H04N 1/00307; H04N 1/00408; H04N 1/32; H04N 1/32797; H04N 1/0097; H04N 1/00482
See application file for complete search history.

(56) References Cited

U.S. PATENT DOCUMENTS 7,139,908 B2    11/2006  Hamamoto et al. .............. 713/2
7,876,358 B2    1/2011   Yamada et al. ............ 348/207.2
(Continued)

FOREIGN PATENT DOCUMENTS

JP    2004-364145    12/2004

*Primary Examiner* — Neil R McLean
(74) *Attorney, Agent, or Firm* — Fitzpatrick, Cella, Harper & Scinto

(57) ABSTRACT

This invention provides a technique which allows the user to select whether or not to make print settings without any special operation such as key operations or button operations upon printing information held by a mobile terminal using a printer. To this end, in a case where it is detected that a mobile terminal is located with an NFC communication range, an NFC communication is established to exchange information so as to prepare for transition to a BT communication, information to be printed is received via the BT communication, thus printing the information. At this time, only in a case where an established state of the NFC communication is continued for a predetermined period of time since the NFC communication is established, a detailed print setting menu is displayed.

20 Claims, 18 Drawing Sheets

(51) Int. Cl.
*H04N 1/00* (2006.01)
*H04N 1/327* (2006.01)

(52) U.S. Cl.
CPC ........... *H04N 2201/0074* (2013.01); *H04N 2201/0084* (2013.01); *H04N 2201/0094* (2013.01)

(56) References Cited

U.S. PATENT DOCUMENTS

| | | |
|---|---|---|
| 8,244,917 B2 | 8/2012 | Takayama et al. ............... 710/1 |
| 2004/0036900 A1 | 2/2004 | Bruce ........................ 358/1.12 |
| 2009/0033792 A1 | 2/2009 | Kato .......................... 358/1.13 |
| 2009/0033972 A1* | 2/2009 | Kato ................. H04N 1/00347 358/1.13 |
| 2009/0103124 A1* | 4/2009 | Kimura ................ G06F 3/1204 358/1.15 |

\* cited by examiner

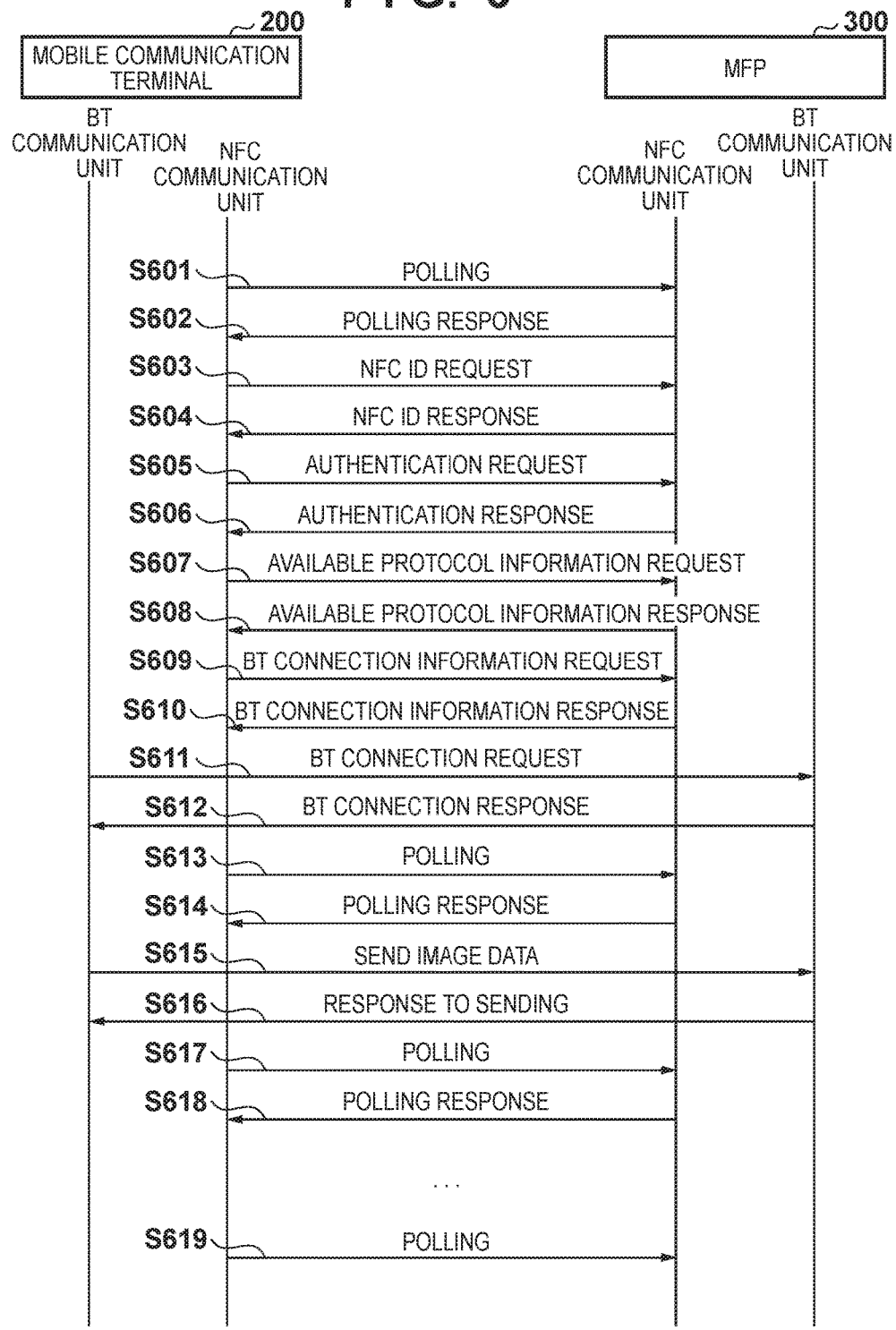

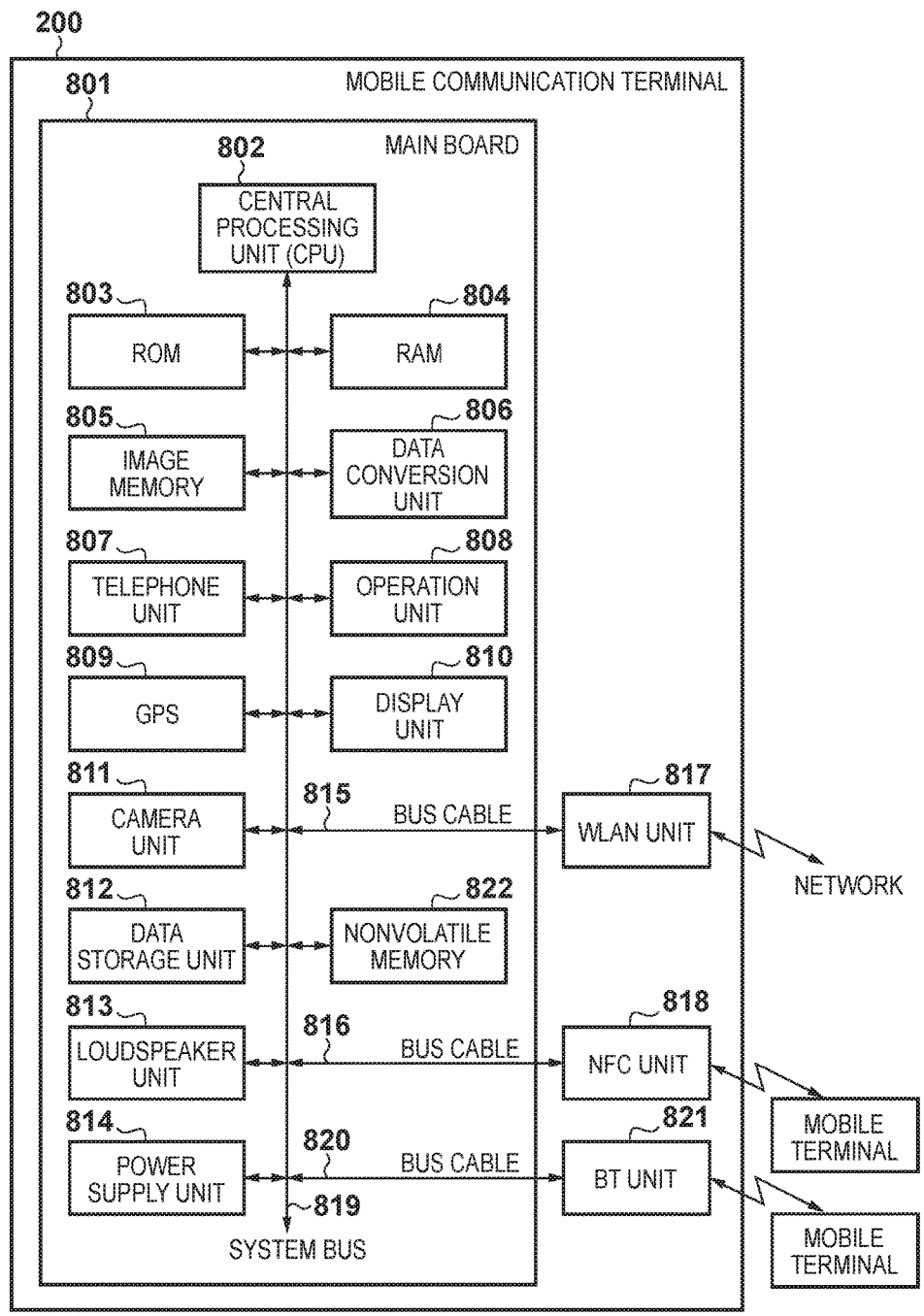

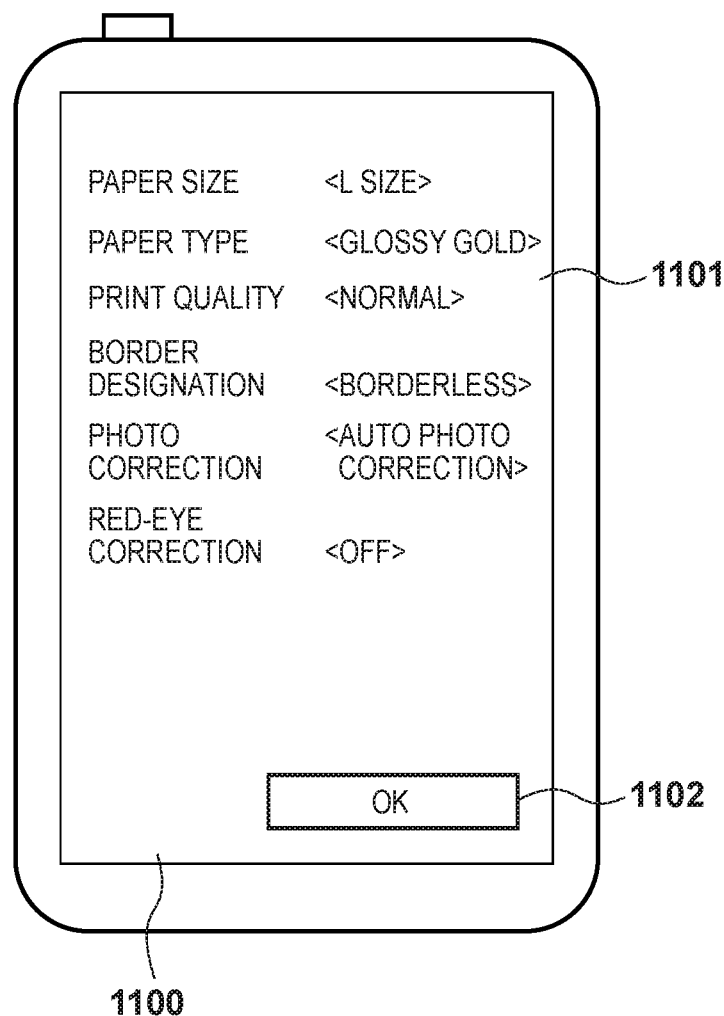

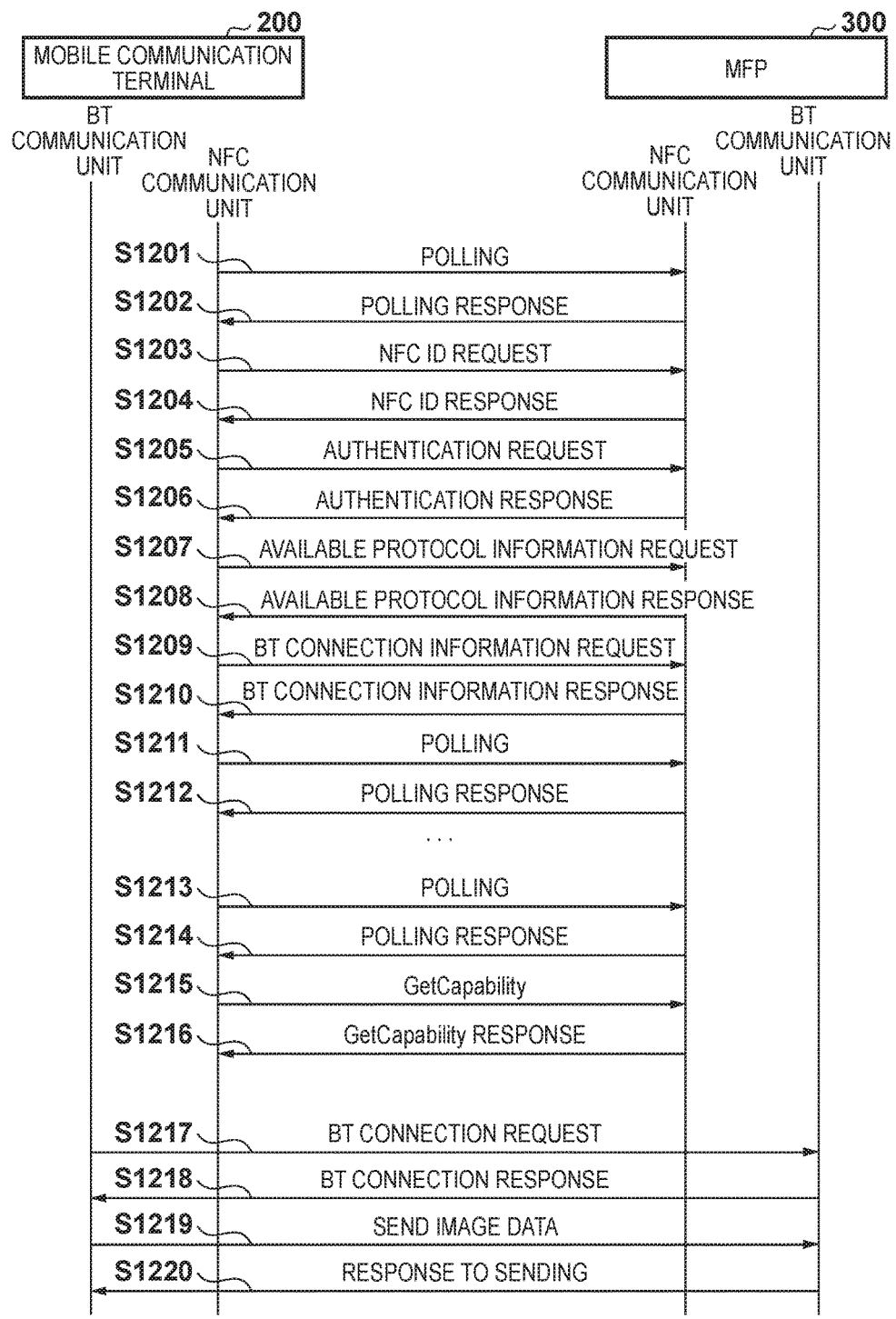

FIG. 13A

```
Get Capability
<?xml version="1.0" encoding="utf-8" ?>
<cmd xmlns:image="http://www.canon.com/ns/cmd/2008/07/common/">
        <image:contents>
                <image:operation>GetCapability</image:operation>
                <image:param_set servicetype="print"></image:param_set>
        </image:contents>
</cmd>
```

F I G. 13B

RESPONSE EXAMPLE

```
<?xml version="1.0" encoding="utf-8" ?>
<cmd xmlns:image="http://www.canon.com/ns/cmd/2008/07/common/">
  <image:contents>
    <image:operation>GetCapabilityResponse</image:operation>
    <image:param_set servicetype="print">
      <image:response>OK</image:response>
      <image:response_detail/>
      <image:support_data_format>RAW,JPEG</image:support_data_format>
      <image:max_pixels>9600,9600</image:max_pixels>
      <image:papersize>na_index-4x6_4x6in,jis_b5_182x257mm,iso_a4_210x297mm</image:papersize>
      <image:printarea_border papersize="na_index-4x6_4x6in">2240,3412</image:printarea_border>
      <image:printarea_borderless papersize="na_index-4x6_4x6in">2533,3766</image:printarea_borderless>
      <image:printarea_border papersize="jis_b5_182x257mm">4139,5882</image:printarea_border>
      <image:printarea_border papersize="iso_a4_210x297mm">4800,6827</image:printarea_border>
      <image:printarea_borderless papersize="iso_a4_210x297mm">5079,7182</image:printarea_borderless>
      <image:papertype>stationery,photographic</image:papertype>
      <image:borderlessprint papertype="stationery">OFF</image:borderlessprint>
      <image:borderlessprint papertype="photographic">ON,OFF</image:borderlessprint>
    </image:param_set>
  </image:contents>
</cmd>
```

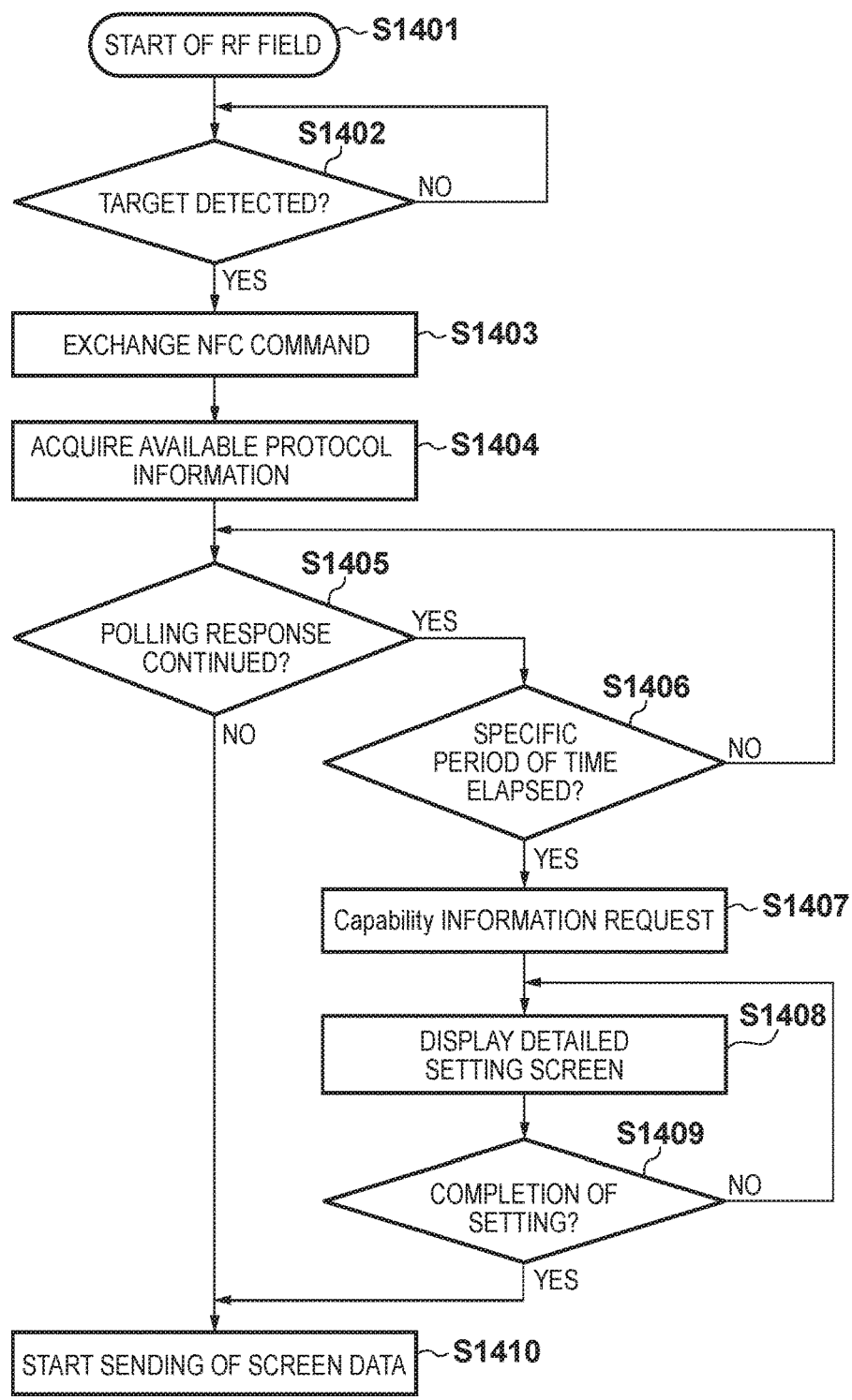

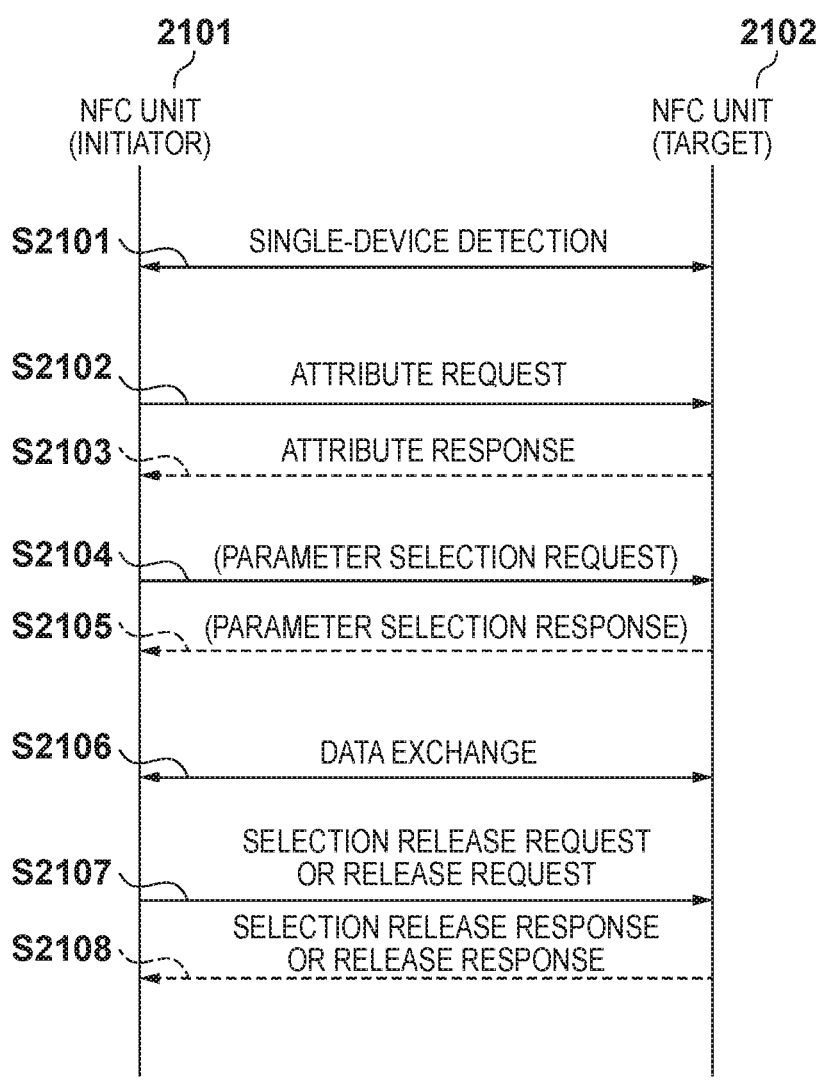

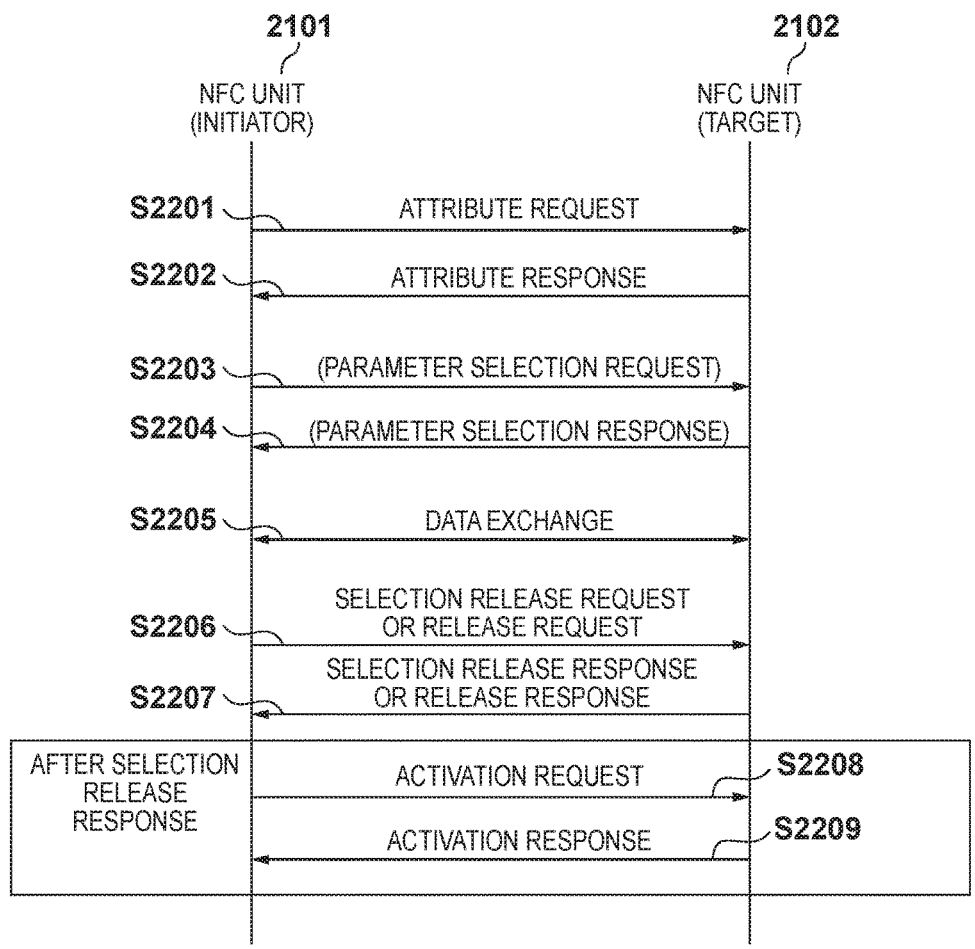

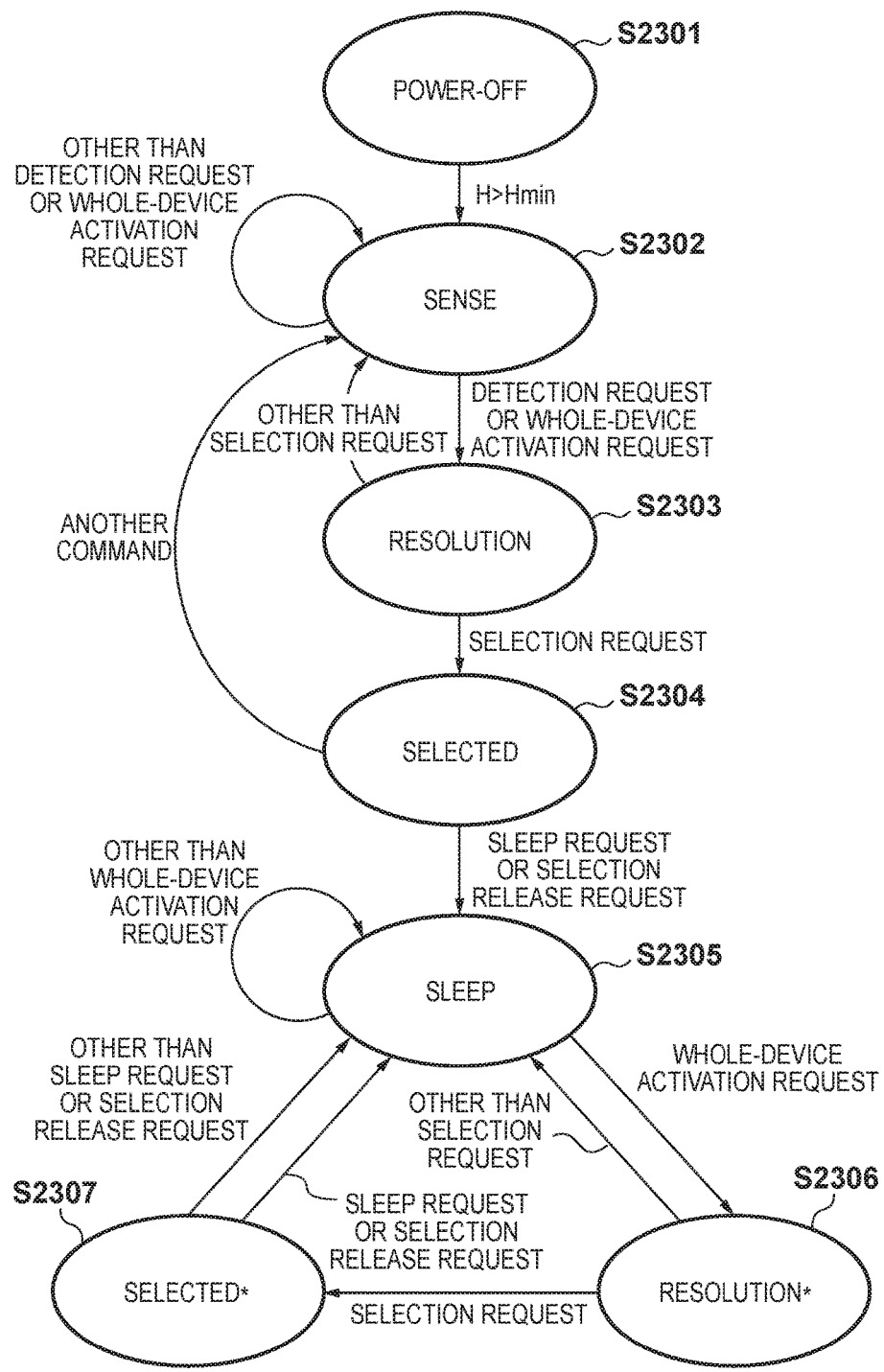

PRINT CONTROL APPARATUS AND CONTROL METHOD THEREOF

CROSS REFERENCE TO RELATED APPLICATION

This application is a continuation of U.S. application Ser. No. 13/779,910 filed on Feb. 28, 2013, the entire disclosure of which is hereby incorporated by reference herein. This application also claims foreign priority under 35 U.S.C. § 119 of Japanese Application No. 2012-048617 filed on Mar. 5, 2012.

BACKGROUND OF THE INVENTION

Field of the Invention

The present invention relates to a device control technique between wireless communication apparatuses which make short distance wireless communications.

Description of the Related Art

In recent years, multi-function mobile phones, that is, so-called smartphones, which incorporate not only a telephone function but also a camera function, network browser function, wireless communicate functions, application execution function (for example, a mail function), and the like have been marketed as products. In terms of wireless communication function, the smartphone incorporates a WLAN (Wireless Local Area Network) communication function, a Bluetooth® communication (to be referred to as "BT communication" hereinafter) function, an IC (Integrated Circuit) card system, and the like in addition to the telephone communication function. With the IC card system of these functions, when another IC card, called a target, gets closer to a device called an initiator which transmits an RF (Radio Frequency) field (magnetic field), the IC card receives a power supply by means of electromagnetic induction, and executes data transfer. As a communication protocol for the IC card system, an NFC (Near Field Communication) has been laid down. On the other hand, a method in which an IC card system specifies and authenticates a device and decides a communication protocol in data transfer between devices including a plurality of communication protocols and a communication of actual large-size data is made by switching (handing over) from the NFC to another protocol that allows high-speed communications such as BT communications is known. An example of literature which discloses such a technique is Japanese Patent Laid-Open No. 2004-364145.

When an image held by a mobile terminal such as the aforementioned smartphone is to be printed by an MFP (Multi Function Printer) including a plurality of functions such as a copy function and scan function, an application on the mobile terminal side selects an image to be printed, and specifies an MFP and exchanges authentication keys in another protocol such as BT communications using NFC communications. After that, image data to be printed is sent via WLAN or BT communications after the handover. The MFP analyzes received image data, and prints an image on a medium such as a paper sheet. By applying such system arrangement, the user can obtain printed image data by means of a simple operation.

The MFP is configured to allow a plurality of print settings. In the aforementioned arrangement since the user cannot make detailed print settings, he or she has to set a paper size, paper type, print quality, and the like in advance on the MFP side. No problem may be posed for the user who executes printing under the same print setting condition for each time. However, in order to meet a request to print an image on a large-sized sheet in some cases, a problem that the user has to change settings prior to communications still remains unsolved. Especially, in an environment in which an unspecified number of users use one printer, individual users have different print preferences or print purposes, this problem cannot be ignored.

SUMMARY OF THE INVENTION

The present invention has been made in consideration of the aforementioned problem. Then, this disclosure provides a technique which allows the user to select whether or not to make print settings without any special operations such as key operations or button operations when information held by a mobile terminal is to be printed using a printer.

In order to solve the aforementioned problem, for example, this disclosure provides a print control apparatus having the following arrangement.

That is, there is provided a print control apparatus comprising:

a communication unit configured to make, in a case where a communication device is located within a communication range required for a predetermined wireless communication method by the communication unit, a wireless communication with the communication device using the predetermined wireless communication method;

a display control unit configured to control, in a case where the wireless communication with the communication device using the predetermined wireless communication method by the communication unit is continued for not less than a predetermined period of time, a display device to display a screen required for a user to designate a print setting upon printing data to be printed; and a print control unit configured to control, in a case where the display control unit controls to display the screen, a printer to print the data to be printed corresponding to print information received from the communication device by the communication unit.

According to the aforementioned arrangement, when information held by a mobile terminal is to be printed by the printer, the user can select whether or not to make print settings without any special operations such as key operations or button operations, and can execute printing under such convenience.

Further features of the present invention will become apparent from the following description of exemplary embodiments (with reference to the attached drawings).

BRIEF DESCRIPTION OF THE DRAWINGS

FIG. 6 is a sequence chart of processing according to the first embodiment;

FIG. 8 is a block diagram of the mobile communication terminal;

FIG. 11 is a view showing a display example of the mobile communication terminal;

FIG. 12 is a sequence chart of the second embodiment;

FIGS. 13A and 13B are views showing description examples of a Capability request and Capability information;

FIG. 14 is a flowchart of the mobile communication terminal;

FIG. 16 is a communication sequence chart in a passive mode;

FIG. 17 is a communication sequence chart in an active mode; and

FIG. 18 is a state transition chart of a target.

DESCRIPTION OF THE EMBODIMENTS

Embodiments according to the present invention will be described in detail hereinafter with reference to the accompanying drawings. Note that the relative layouts of components, display screens, and the like described in this embodiment do not limit the scope of the present invention unless otherwise specified.

First Embodiment

The first embodiment will explain an example in which after authentication is executed by a low-speed communication unit using a short distance wireless communication method, the communication unit is then switched to a high-speed communication unit of a wireless communication, thereby sending print data. More specifically, a print method which adopts a handover technique that executes authentication via short distance wireless communications such as NFC (Near Field Communications), and a wireless communication of another communication method inherits the communications will be described below.

Figure 2:
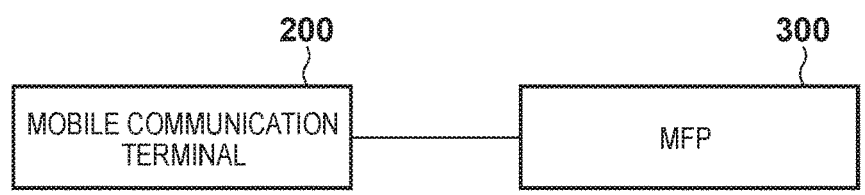
FIG. 2 is a diagram showing the overall arrangement of a system.

FIG. 2 shows the arrangement of a wireless communication system according to this embodiment. A mobile communication terminal 200 and multi function printer (to be referred to as an MFP hereinafter) 300 are connected. The mobile communication terminal 200 includes at least two types of wireless communication units having different authentication methods and communication rates. The mobile communication terminal 200 is not particularly limited, and a personal information terminal such as a PDA (Personal Digital Assistant), mobile phone, digital camera, and the like may be used as long as they can handle files to be printed. The MFP 300 has a print function using a printing unit such as an inkjet printer, and includes a display device and operation panel which allow the user to make various settings. The MFP 300 may also have a scanning function of scanning a document image placed on a platen, FAX function, and telephone function.

Figure 3:
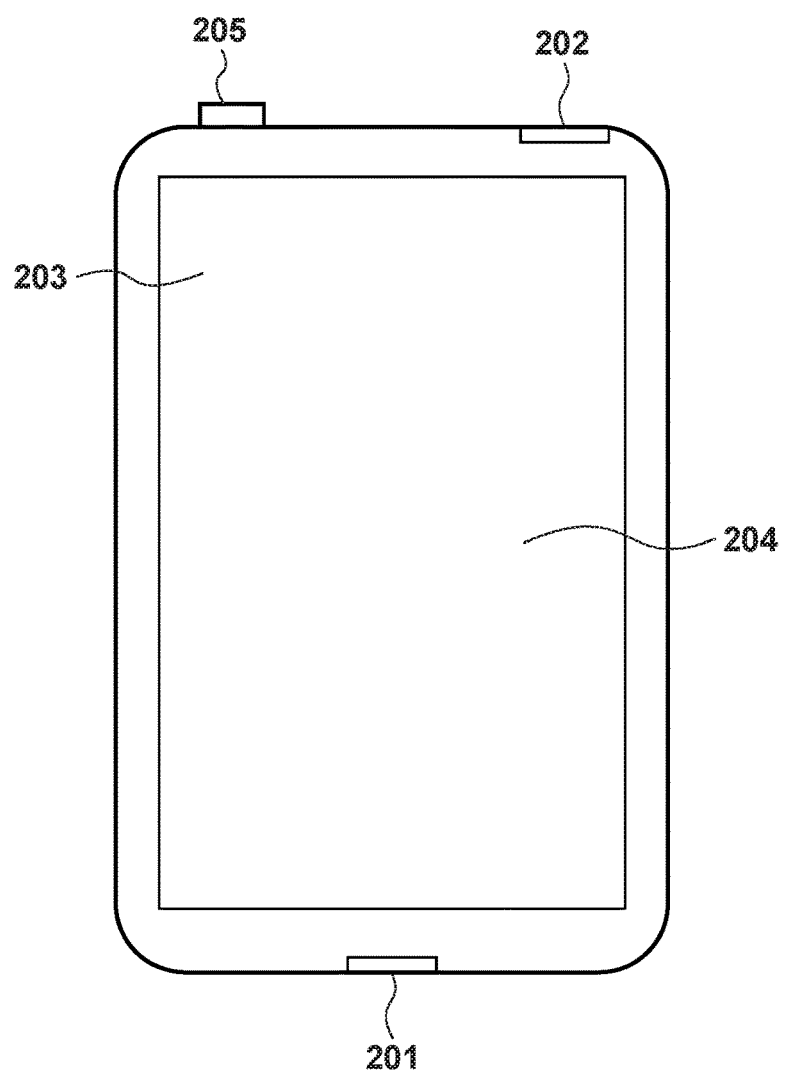
FIG. 3 is a view showing the outer appearance of a mobile communication terminal.

FIG. 3 shows the outer appearance of the mobile communication terminal 200. This embodiment will exemplify a smartphone. The "smartphone" means a multi-function mobile phone which incorporates a camera, network browser, mail function, and the like in addition to functions of a mobile phone. An NFC unit 201 is a unit required to make communications using the NFC. When the NFC unit 201 is moved closer to a partner NFC unit within a range of about 10 cm, they can communicate with each other in practice. A BT unit 202 is a unit required to make Bluetooth communications, and is arranged inside the terminal 200. A display unit 203 is, for example, a display including an LCD type display mechanism. An operation unit 204 includes an electrostatic touch panel type transparent operation mechanism, which covers a display screen of the display unit 203, and detects operation information of the user. As a representative operation method, the display unit 203 displays software buttons, and the user touches a button on the operation unit 204, thus issuing an event associated with that button portion and executing processing. A power key 205 is used to turn on/off a power supply.

Figure 4A:
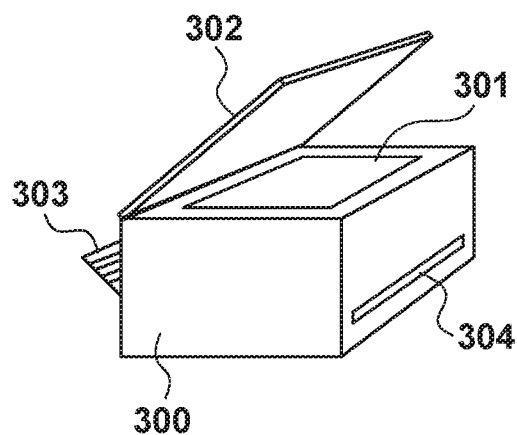
FIGS. 4A and 4B are views showing the outer appearance of the MFP.
Figure 4B:
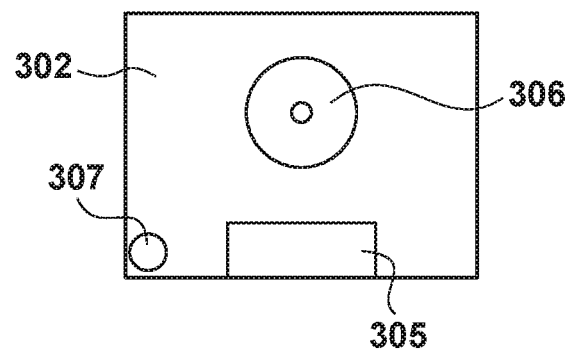

FIG. 4A is a perspective view showing the outer appearance of the MFP 300, and FIG. 4B is a top view of the MFP 300. A platen 301 is a glass-like transparent table, which is used to scan a document placed on itself using a scanner. A document cover 302 is a cover required to prevent scanning light from externally leaking at the time of scanning by the scanner. A printing sheet insertion port 303 is an insertion port on which paper sheets of various sizes are set. Paper sheets set on the printing sheet insertion port 303 are conveyed one by one to a printing unit, and are discharged from a printing sheet discharge port 304 after a desired printing operation. An operation/display unit 305 and NFC unit 306 are arranged on an upper portion of the document cover 302. The operation/display unit 305 includes keys used to make various operations and an LCD information display unit, and is configured to allow the user to make operations and settings associated with the MFP 300. The NFC unit 306 is a unit required to make NFC, and is a place where a partner apparatus is approximated to the MFP. A distance of about 10 cm from the NFC unit 306 is an effective distance of a contact. In a BT unit 307, a communication module required to make BT communications and an antenna are embedded.

FIG. 8 is a block diagram of the mobile communication terminal 200 (as a smartphone) according to this embodiment.

The mobile communication terminal 200 includes a main board 801 which executes main control of the terminal itself, a WLAN unit 817 which makes WLAN communications, an NFC unit 818 which makes NFC communications, and a BT unit 821 which makes Bluetooth® communications.

In the main board 801, a CPU 802 is a system control unit, and controls the overall mobile communication terminal 200. A ROM 803 stores control programs to be executed by the CPU 802, embedded operating system (OS) program, and the like. In this embodiment, respective control programs stored in the ROM 803 implement software control such as scheduling and task switching under the management of the embedded OS stored in the ROM 803.

A RAM 804 includes an SRAM (Static RAM) or the like, stores program control variables and the like, also stores data such as setting values registered by the user and management data of the mobile communication terminal 200, and is allocated with various work buffer areas.

An image memory 805 includes a DRAM (Dynamic RAM) or the like, and temporarily stores image data received via a communication unit and those which are read out from a data storage unit 812 so as to be processed by the CPU 802. A nonvolatile memory 822 includes a flash memory or the like, and stores data to be saved even after power-OFF. Such data include, for example, address book data, previously connected device information, and the like. Note that such memory configuration is not limited to this. For example, the image memory 805 and RAM 804 may be shared, or data may be backed up in the data storage unit 812. In this embodiment, the DRAM is used as the image memory 805. However, the present invention is not limited to this since other storage media such as a hard disk and nonvolatile memory may be used.

A data conversion unit 806 executes analysis of a page description language (PDL) and the like, and data conversion such as color conversion and image conversion. A telephone unit 807 controls a telephone line, and realizes telephone communications by processing audio data input/output via a loudspeaker unit 813. An operation unit 808 controls signals of the operation unit 204 described using FIG. 2. A GPS (Global Positioning System) 809 acquires, for example, the current latitude and longitude, and the like. A display unit 810 electronically controls the display contents of the display unit 203 described using FIG. 2, allows various input operations, and can display operation states, status conditions, and the like of the MFP 300.

A camera unit 811 has a function of digitally recording and encoding an image input via a lens. An image captured by the camera unit 811 is saved in the data storage unit 812. The loudspeaker unit 813 realizes a function of inputting or outputting a speech for a telephone function, and also an alarm notification function and the like. A power supply unit 814 includes a portable battery, and controls that battery. A power supply state includes a battery dead state in which the battery has no remaining amount, a power-OFF state in which the power key 205 is not pressed, an active state in which the apparatus is normally active, and a power saving state in which the apparatus is active but is set in a power saving mode.

The mobile communication terminal 200 incorporates three WLAN, NFC, and Bluetooth® units required to make wireless communications, and can make wireless communications using any of these units. When the mobile communication terminal 200 makes data communications with another device such as the MFP, it converts data into packets, and makes packet transmission to the other device. Conversely, the mobile communication terminal 200 converts packets coming from another external device into data, and sends the data to the CPU 101. The WLAN unit 817, NFC unit 818, and BT unit 821 are connected respectively via bus cables and the like. The WLAN unit 817, NFC unit 818, and BT unit 821 are units required to attain communications compliant with the standards. Details of the NFC unit 818 will be described later with reference to FIG. 10.

The respective components 803 to 814, 817, 818, 821, and 822 in the main board 801 are connected to each other via a system bus 819 managed by the CPU 802.

Figure 9:
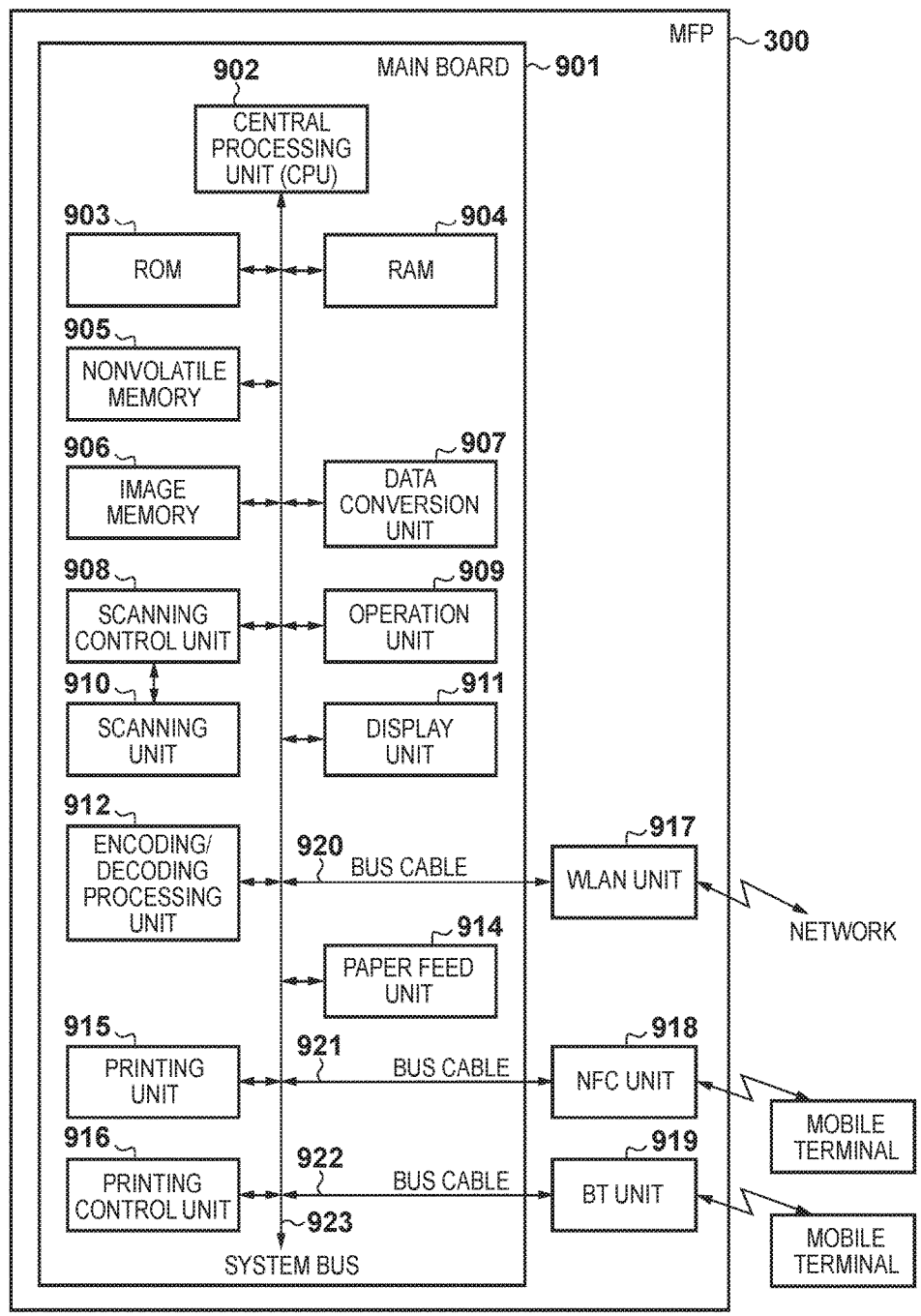
FIG. 9 is a block diagram of the MFP.

FIG. 9 is a schematic block diagram showing the arrangement of the MFP 300. The MFP 300 includes a main board 901 which executes main control of the apparatus itself, a WLAN unit 917 which makes WLAN communications, an NFC unit 918 which makes NFC communications, and a BT unit 919 which makes Bluetooth® communications.

In the main board 901, a CPU 902 is a system control unit, and controls the overall MFP 300. A ROM 903 stores control programs to be executed by the CPU 902, an embedded operating system (OS) program, and the like. In this embodiment, respective control programs stored in the ROM 903 implement software control such as scheduling and task switching under the management of the embedded OS stored in the ROM 903.

A RAM 904 includes an SRAM (Static RAM), stores program control variables and the like, also stores setting values registered by the user and management data of the MFP 300, and is allocated with various work buffer areas. A nonvolatile memory 905 includes a flash memory or the like, and stores data to be held even after power-OFF. More specifically, such data include network connection information, user data, and the like. An image memory 906 includes a DRAM (Dynamic RAM) or the like, and stores image data received via respective communication units, those processed by an encoding/decoding processing unit 912, and those acquired via a memory card controller 516. Also, as in the memory configuration of the mobile communication terminal 200, the present invention is not limited to such specific memory configuration. A data conversion unit 907 executes analysis of a page description language (PDL) and the like, conversion from image data into print data, and the like.

A scanning control unit 908 will be described below. A scanning unit 910 optically scans a document by, for example, a CIS sensor (contact image sensor). Next, the scanning control unit 908 applies various kinds of image processing such as binarizing processing and halftone processing to an image signal converted into electrical image data via an image processing control unit (not shown), thereby outputting high-resolution image data.

An operation unit 909 and display unit 911 correspond to the operation/display unit 305 described using FIG. 4. The encoding/decoding processing unit 912 executes encoding/decoding processing and enlargement/reduction processing of image data (JPEG, PNG, etc.) handled by the MFP 300.

A paper feed unit 914 can hold paper sheets used in printing. A paper sheet can be fed from the paper feed unit 914 under the control of a printing control unit 916. Especially, as the paper feed unit 914, a plurality of paper feed units can be prepared so as to hold a plurality of types of paper sheets in one apparatus. Then, the printing control unit 916 can control to select a paper feed unit used to supply paper sheets.

The printing control unit 916 applies various kinds of image processing such as smoothing processing, printing density correction processing, and color correction to image data to be printed via an image processing control unit (not shown) to convert that image data into high-resolution image data, and outputs the converted data to a printing unit 915. The printing control unit 916 also assumes a role of periodically reading out information of the printing unit, and updating information in the RAM 904. More specifically, the printing control unit 916 updates the remaining amount of an ink tank and a printhead state.

The MFP 300 also incorporates three communication units required to make wireless communications as in the mobile communication terminal 200, and a description of these communication units will not be repeated since their functions are the same. The respective components 902 to 919 are connected to each other via a system bus 923 managed by the CPU 902.

Figure 10:
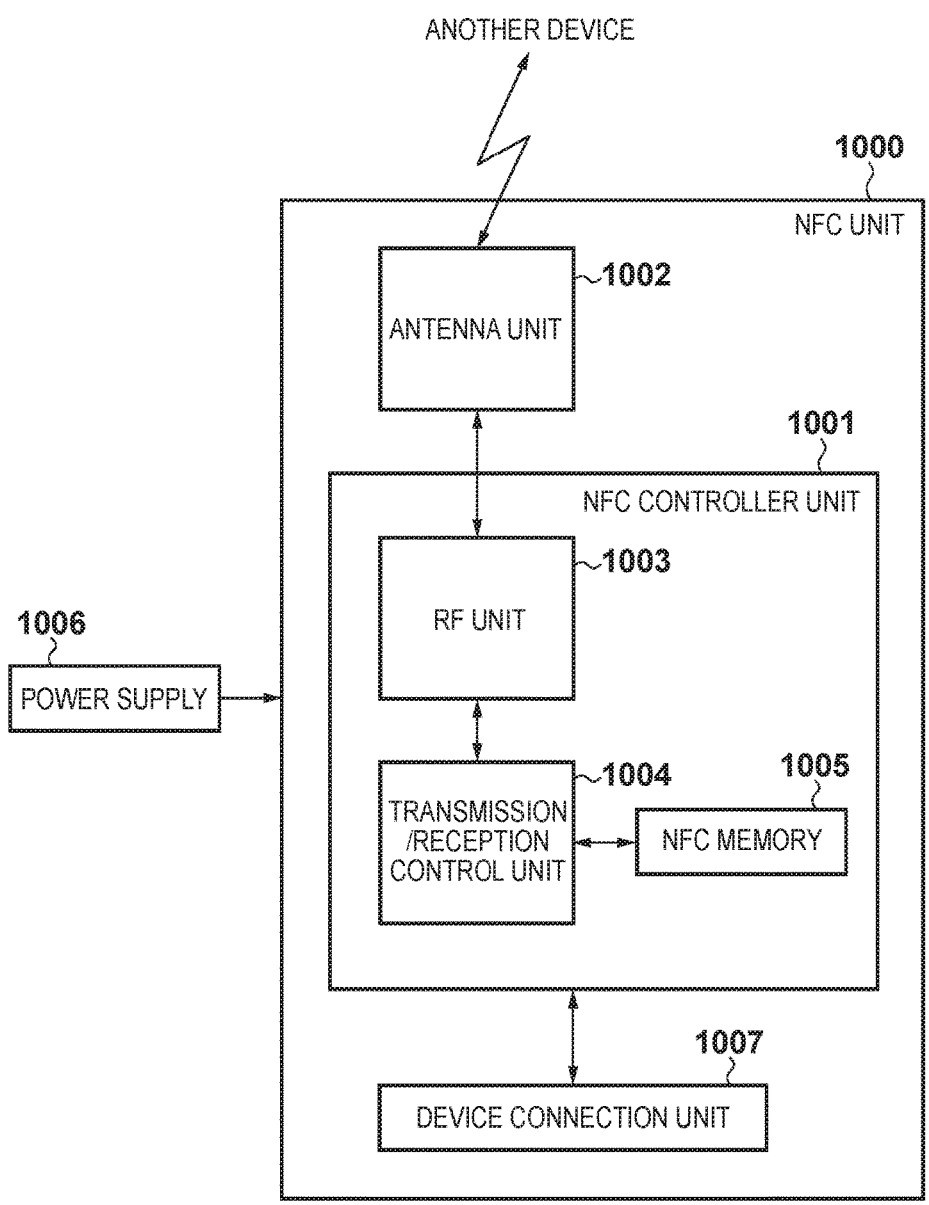
FIG. 10 is a block diagram for explaining details of an NFC unit.

FIG. 10 is a block diagram showing details of an NFC unit used in the NFC unit 818 or 918. The arrangement of an NFC unit 1000 will be described below with reference to FIG. 10. The NFC unit 1000 includes an NFC controller unit 1001, antenna unit 1002, RF unit 1003, transmission/reception control unit 1004, NFC memory 1005, power supply 1006, and device connection unit 1007. The antenna unit 1002 receives electromagnetic waves and carriers from another NFC device, and sends electromagnetic waves and carriers to another NFC device. The RF unit 1003 has a function of modulating an analog signal to a digital signal and demodulating the digital signal into the analog signal. The RF unit 1003 includes a synthesizer, and controls bands and channels based on frequency assigned data by identifying frequencies of bands and channels. The transmission/reception control unit 1004 executes control associated with transmission/reception such as assembling/disassembling of transmission/reception frames, appending and detection of a preamble, and frame identification. Also, the transmission/reception control unit 1004 controls the NFC memory 1005 to read/write various data and programs. When the NFC unit operates in the active mode, it receives electric power via the power supply 1006 (a main power supply of the smartphone or MFP) to communicate with a device via the device connection unit 1007 and to communicate with another NFC device located within a communication range by carriers sent/received via the antenna unit 1002. When the NFC unit operates in the passive mode, it receives carriers from another NFC device via the antenna unit to wirelessly receive electric power from that NFC device by electromagnetic induction, and exchanges data via communications with that NFC device by modulating carriers.

Figure 15:
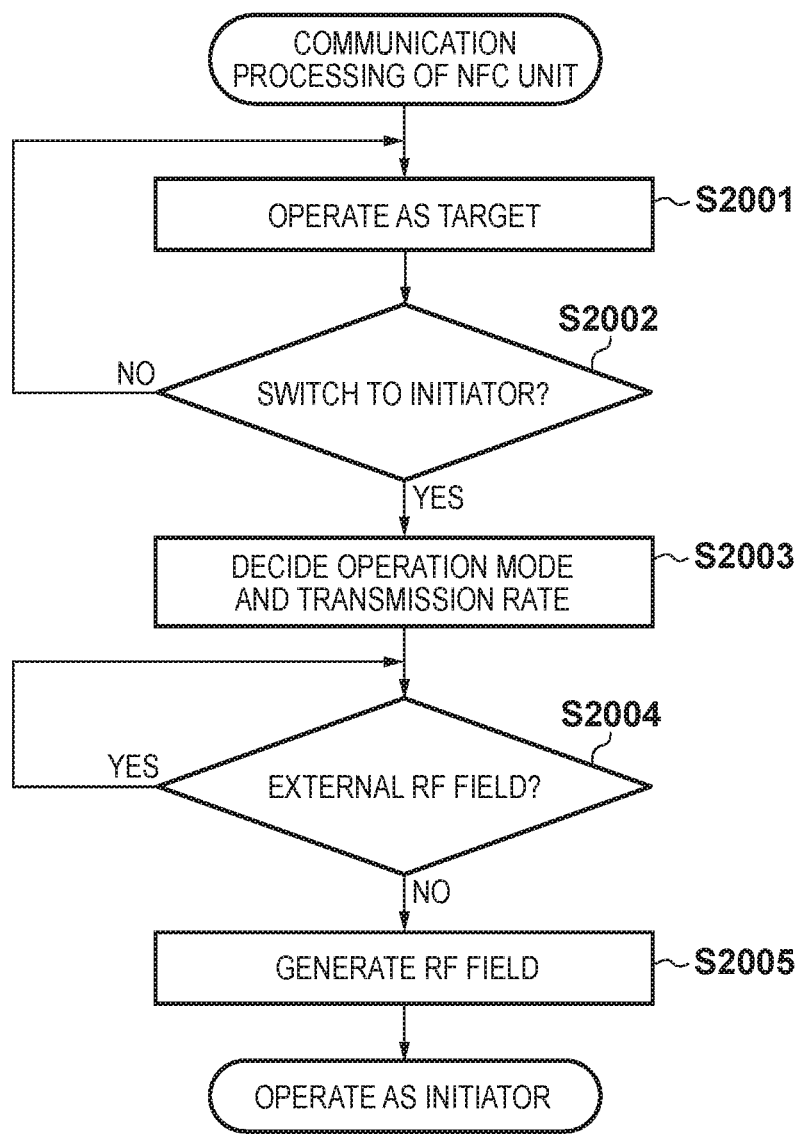
FIG. 15 is a flowchart until a device operates as an initiator.

FIG. 15 is a flowchart required for the NFC unit to operate as an initiator.

Initially, in step S2001, all NFC units operate as a target, and are set in a waiting state of a command from an initiator. Next, in step S2002, each NFC unit can be switched to an initiator in response to a request from an application, which controls communications based on the NFC standard. If the NFC unit is switched to an initiator in response to the request, the application has to select one of the active mode and passive mode and decide a transmission rate in step S2003. Then, in step S2004, the initiator detects an external RF field output from an apparatus other than the self apparatus. If the external RF field is detected, the initiator does not generate a self RF field. If no external RF field is detected, the process advances to step S2005, and the initiator generates a self RF field. Via the aforementioned steps, the NFC unit begins to operate as the initiator.

FIG. 16 is a sequence chart of data exchange in the passive mode. In FIG. 16, a case will be described below wherein an NFC unit 2101 operates as an initiator, and an NFC unit 2102 operates as a target.

In step S2101, the NFC unit 2101 executes single-device detection to specify the NFC unit 2102. Next, in step S2102, the NFC unit 2101 sends a self identifier, a bit transmission rate of sending/reception, a valid data length, and the like as an attribute request. The attribute request has general bytes, and can be arbitrarily selected and used. When the NFC unit 2102 receives a valid attribute request, it sends an attribute response in step S2103. In this case, the response is sent from the NFC unit 2102 by load modulation, and data sending by means of load transmission is expressed by a dotted line arrow in FIG. 16.

In step S2104, after the NFC unit 2101 confirms a valid attribute response, it sends a parameter selection request to be able to change parameters of a subsequent transmission protocol. Parameters included in the parameter selection request are a transmission rate and valid data length. When the NFC unit 2102 receives a valid parameter selection request, it sends a parameter selection response in step S2105, and changes the parameters. Note that steps S2104 and S2105 may be omitted if parameters are not changed.

In step S2106, the NFC units 2101 and 2102 exchange data by a data exchange request and data exchange response. The data exchange request and response can send information for applications included in communication partners as data, and can divisionally send information when a data size is large.

Upon completion of data exchange, the process advances to step S2107, and the NFC unit 2101 sends either a selection release request or release request. When the NFC unit 2101 transmits the selection release request, the NFC unit 2102 sends a selection release response in step S2108. Upon reception of the selection release request, the NFC unit 2101 releases the attributes indicating the NFC unit 2102, and the process returns to step S2101. When the NFC unit 2101 sends a release request, the NFC unit 2102 sends a release response and returns to an initial state in step S2108. When the NFC unit 2101 receives the release response, it may return to an initial state since the target is completely released.

FIG. 17 is a sequence chart of data exchange in the active mode. In FIG. 17, a case will be described below wherein an NFC unit 2101 operates as an initiator, and an NFC unit 2102 operates as a target.

In step S2201, the NFC unit 2101 transmits a self identifier, a bit transmission rate of sending/reception, a valid data length, and the like as an attribute request. Upon reception of a valid attribute request, the NFC unit 2102 transmits an attribute response in step S2202. In this case, the request is sent from the NFC unit 2102 by an RF field generated by itself. For this reason, the NFC units 2101 and 2102 stop outputting of an RF field after completion of data sending.

After the NFC unit 2101 confirms a valid attribute response, it sends a parameter selection request to be able to change parameters of a transmission protocol in step S2203. Parameters included in the parameter selection request are a transmission rate and valid data length. Upon reception of a valid parameter selection request, the NFC unit 2102 sends a parameter selection response and changes the parameters in step S2204. Note that as in the passive mode, steps S2203 and S2204 may be omitted if the parameters are not changed.

In step S2205, the NFC units 2101 and 2102 exchange data by a data exchange request and data exchange response. The data exchange request and response can send information for applications included in communication partners as data, and can divisionally send information when a data size is large.

Upon completion of data exchange, the process advances to step S2206, and the NFC unit 2101 sends either a selection release request or release request. When the NFC unit 2101 sends the selection release request, the NFC unit 2102 sends a selection release response in step S2207. Upon reception of the selection release request, the NFC unit 2101 releases the attributes indicating the NFC unit 2102. After that, the NFC unit 2101 sends an activation request to another target, an identifier of which is given in step S2208. A target, which received the activation request, sends an activation response in step S2209, and the process returns to step S2201. When the NFC unit 2101 sends the release request, the NFC unit 2102 sends a release response in step S2208 and returns to the initial state. When the NFC unit 2101 receives the release response, it may return to the initial state since the target is completely released.

FIG. 18 shows state transitions of a target in the NFC.

A POWER-OFF state S2301 represents a power-off state. In this state S2301, when the target is placed in a magnetic field H larger than a threshold Hmin, it transits to a SENSE state S2302. In the SENSE state S2302, the target waits for a command from an initiator. Upon reception of a detection request or whole-device activation request, the target transits to a RESOLUTION state S2303, and returns a detection response. Upon reception of another command, the target stays in the SENSE state S2302. In the RESOLUTION state S2303, single-device detection is used. When a valid selection request is received as a result of the single-device detection, the target returns a selection response to an initiator, and transits to a SELECTED state S2304. Upon reception of another command, the target returns to the SENSE state S2302.

In the SELECTED state S2304, the target recognizes an attribute request, a parameter selection request, or a command of a valid unique specification. Upon reception of a valid sleep request or selection release request, the target transits to a SLEEP state S2305. Upon reception of another command, the target returns to the SENSE state S2302.

Upon reception of a whole-device activation request, the target in the SLEEP state S2305 returns a detection response, and then transits to a RESOLUTION* state S2306. Upon reception of another command, the target stays in the SLEEP state S2305. The RESOLUTION* state S2306 is nearly the same as the RESOLUTION state S2303, and single-device detection is used. Upon reception of a valid selection request, the target transits to a SELECTED* state S2307. Upon reception of another command, the target stays in the SLEEP state S2305. The SELECTED* state S2307 is nearly the same as the SELECTED state S2304, and the target recognizes an attribute request, a parameter selection request, or a command of a valid unique specification. Upon reception of a valid sleep request or selection release request, the target transits to the SLEEP state. Upon reception of another command, the target falls back to the SLEEP state.

The NFC unit and the communication sequences between the NFC units according to this embodiment have been described. The NFC unit 818 included in the mobile communication terminal 200 and the NFC unit 918 included in the MFP 300 execute the aforementioned sequences.

A practical example in which the aforementioned sequences are applied to print processing for printing image data stored in the mobile communication terminal 200 by the MFP 300 according to the first embodiment will be described in detail below.

Figure 5A:
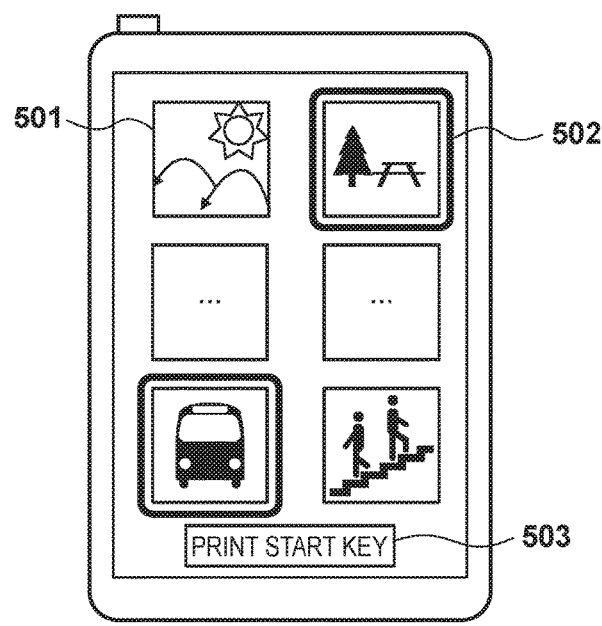
FIGS. 5A to 5C are views showing display examples of the mobile communication terminal.
Figure 5B:
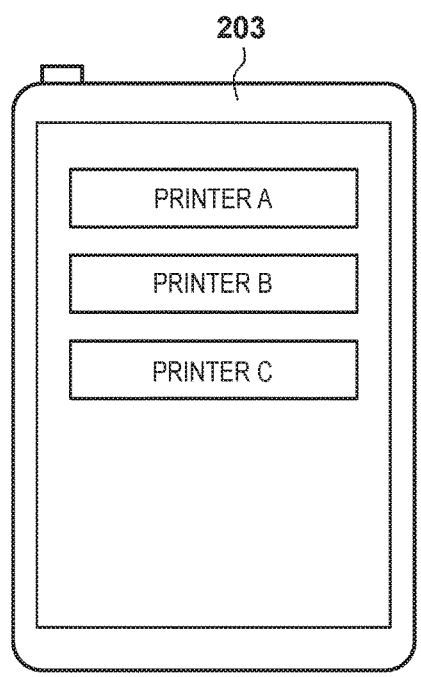
Figure 5C:
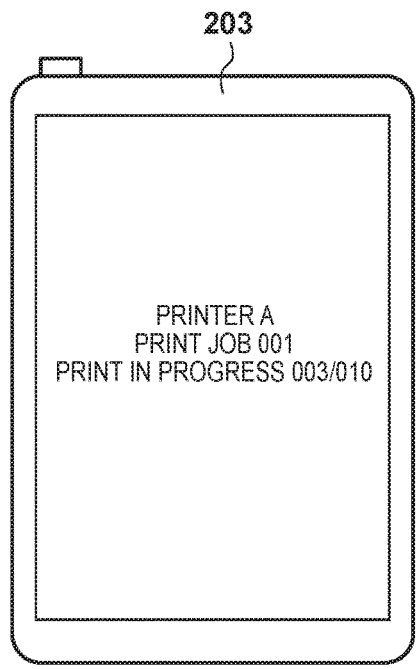

FIGS. 5A to 5C show an example of an image printing application which runs on the mobile communication terminal 200. When the application is launched, thumbnails 501 of image data are initially displayed on the touch panel display screen 203 as an image selection screen shown in FIG. 5A, so as to allow the user to select a desired image. The selected image is displayed together with a focus 502 (a bold frame in FIG. 5A) so as to be distinguished from other images in a non-focus state. This application also allows an image to be displayed in an enlarged/reduced scale, and allows the user to confirm image information such as a photographing date in addition to image selection (not shown). The user can select an image to be printed on the display screen shown in FIG. 5A. Note that in FIG. 5A, the user selects not only an image to be printed, but he or she may select a folder to be printed so as to designate files in the selected folder as those to be printed. When the user selects one or a plurality of images, and touches a displayed print start key 503 to instruct to print the selected images, MFPs are searched for via the BT unit 202 based on an inquiry request, and a name list of found MFPs is displayed on the display screen of the display unit 203. Note that when the user touches the print start key 503, a list indicating files to be printed selected by the user or that of folders to be printed selected by the user is generated. This list includes file paths indicating a folder that stores files to be printed and these files in a memory of the mobile communication terminal 200 as specifying information required to specify data to be printed. In processing to be described later, the MFP 300 specifies files to be printed using this list, thus executing PULL print processing.

A printer selection screen shown in FIG. 5B shows a display example of found printers. On the other hand, simultaneously with the printer search via BT communications, an RF field is formed around the antenna of the NFC unit 201 (818) to make NFC communications, and to search for a target (the NFC unit 918 on the MFP in this embodiment). When an MFP which serves as a target is found by locating the mobile communication terminal 200 in the vicinity of the MFP 300, the device search based on the inquiry request of the BT communications is stopped, and communications based on the NFC communication protocol are started to acquire information required for the BT communications. The mobile communication terminal 200 establishes a connection to the MFP 300, which is found as a target, via BT communications based on the data received via the NFC communications, and transfers image data to the MFP 300. In order to present an image data sending state to the user, a print state display screen shown in FIG. 5C, which includes print image information and a data transfer status, is displayed. In the description of this embodiment, the case has been exemplified wherein the mobile communication terminal 200 serves as an initiator of the NFC communications to make communications in the passive mode. However, the object of the present invention can be achieved even by a connection method in which the MFP side serves as an initiator or a method in which both the devices are set in the active mode to make communications.

The NFC communication protocol and BT communication protocol between the mobile communication terminal 200 and MFP 300 will be described in detail below with reference to the sequence chart shown in FIG. 6.

The mobile communication terminal 200 sends a polling command via NFC communications so as to search for a device to which an image is to be sent (step S601). When the MFP 300 returns a response to the polling command (step S602), the mobile communication terminal 200 judges that a target is found, and issues an NFC ID request including a self NFC ID (step S603). The MFP 300 receives this request, and sends a self NFC ID as a response to the request (step S604). With the above sequence, the mobile communication terminal 200 and MFP 300 specify communication partners based on the received NFC IDs. After that, the mutual devices exchange keys to issue an authentication request (step S605) and authentication response (step S606), thus achieving mutual authentication and encrypting subsequent communications.

Next, the mobile communication terminal 200 issues a request of information associated with other available protocols (step S607). Upon reception of this request, the MFP 300 returns information associated with other available protocols of itself (including BT communications) (step S608). The mobile communication terminal 200 selects BT communications faster than the NFC as a protocol suited to send image data based on the received protocol information. Next, the mobile communication terminal 200 issues a request of information associated with a Bluetooth Device Address (BD_ADDR), passkey, and link key required to establish a BT communication connection with the MFP 300

(step S609), and receives information required to establish the BT communication connection as a response from the MFP 300 (step S610).

The mobile communication terminal 200 issues a BT connection request (step S611) using the BT communication unit 202 based on the received information, and the MFP 300 responds to the connection request (step S612), thus establishing a BT link connection. The mobile communication terminal 200 sends selected image data to the MFP 300 via BT communications (steps S615 and S616). On the other hand, the NFC communication unit of the mobile communication terminal 200 continuously sends polling commands irrespective of the BT communications (steps S613 and S617), and the MFP 300 returns responses to the polling commands (steps S614 and S618). When a response to the polling command (step S619) ceases to be returned, it is detected that the mobile communication terminal 200 and MFP 300 are physically distant from each other. Since the mobile communication terminal 200 issues this polling command so as to confirm if it is located in the vicinity of the MFP 300, the terminal 200 may issue other commands to achieve the object of the present invention. Alternatively, the mobile communication terminal 200 may continuously form an RF field without sending any command, and the MFP 300 may continuously detect the RF field, thereby also achieving the object of the present invention. This embodiment has explained the sequence in which image data is sent in a so-called PUSH type mode based on the BT communications. Alternatively, the object of the present invention can also be achieved by a method in which data is acquired from the MFP side in a PULL type mode, a method of sending image data using other protocols such as a WLAN connection other than the BT communications, a method in which image data is saved in a server on the Internet, and the MFP receives URL information of image data to be printed and directly acquires image data from the server, and the like.

Figure 1:
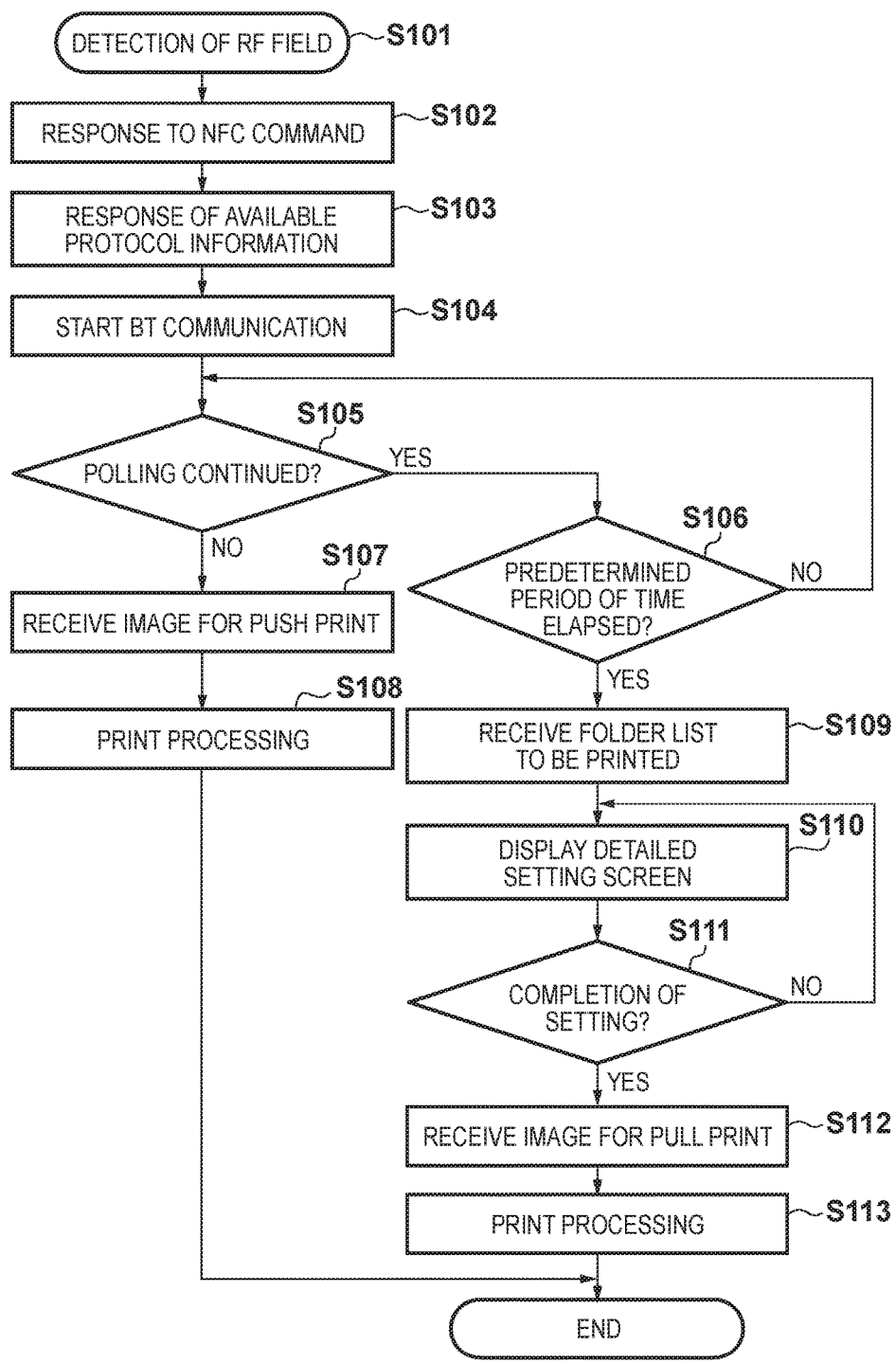
FIG. 1 is a flowchart (representative view) showing the control sequence of an MFP.

Communication control in the MFP 300 will be described in detail below with reference to the flowchart shown in FIG. 1 and screen display examples shown in FIGS. 7A and 7B.

When the mobile communication terminal 200 which forms an RF field gets closer to the MFP 300, and the MFP 300 detects that RF field (step S101), the MFP 300 returns responses to an ID request and authentication request via NFC communications (step S102). Next, the MFP 300 exchanges available communication protocol information and information required for that communication processing (step S103). The mobile communication terminal 200 and MFP 300 establish BT communications based on information exchanged via the communications (step S104). The same processing as the aforementioned communication processing (first communication control processing) of the MFP 300 is also executed in the mobile communication terminal 200 (second communication control processing).

Note that when the BT communications have been successfully established, the user is informed of that fact by displaying a message on a screen or outputting a buzzer tone (not shown).

When the BT communications have been established, the MFP 300 detects polling commands from the mobile communication terminal 200 via the NFC unit 918 (steps S613 and S617), as described using FIG. 6, thereby detecting whether or not the mobile communication terminal 200 is still located within an NFC communication range (step S105). If the NFC unit 918 of the MFP 300 does not detect any polling command, that is, if the mobile communication terminal 200 moves to fall outside the communication range of the NFC unit 918 of the MFP 300, the MFP 300 prints image data sent in a PUSH type mode based on the BT communications (step S108). At this time, print settings are made according to default settings which were made in advance on the MFP side (first print control processing). Note that in step S108, print setting set by the mobile communication terminal 200 may be used in place of those which were set in advance on the MFP side. More specifically, print processing is executed according to print settings received together with data to be printed via the BT communications. Alternatively, when print settings fail to be received via the BT communications, print processing may be executed according to the print settings, which were made in advance on the MFP side.

Figure 7A:
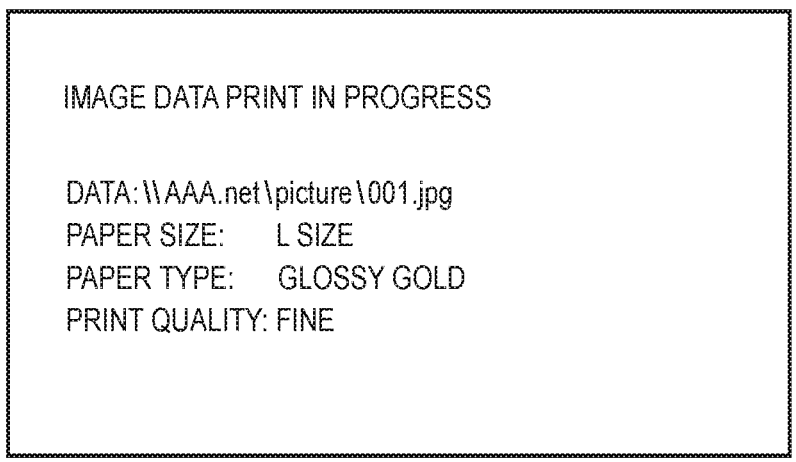
FIGS. 7A and 7B are views showing display screen examples of a printer.
Figure 7B:
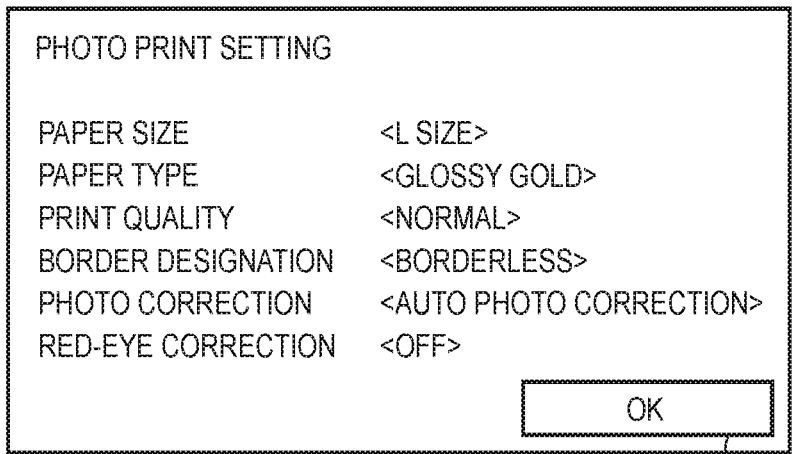

Also, during the print processing via the BT communications, a screen shown in FIG. 7A is displayed on the display unit 911.

On the other hand, if the NFC unit 918 detects the polling command immediately after the BT communications are established, the MFP 300 determines whether or not a polling detection duration is equal to or larger than a pre-set threshold (step S106). If NO in step S106, steps S105 and S106 are looped as long as the polling command is detected. If the user moves the mobile communication terminal 200 to fall outside the NFC communication range during this interval (if the duration in which the BT communications are established is less than the threshold), since the NFC communications are disconnected, NO is determined in step S105, and the process advances to step S108 to execute print processing according to default settings.

On the other hand, if the MFP 300 determines that the user continuously puts the mobile communication terminal 200 over the NFC unit 918 of the MFP 300 for 2 sec or longer since the BT communications are established, it receives a folder list indicating folders to be printed from the mobile communication terminal 200 via the NFC unit 918 (step S109). Note that when the user has selected files to be printed shown in FIG. 5A on the mobile communication terminal 200, the MFP 300 receives a file list indicating files to be printed. Then, the MFP 300 displays a detailed print setting screen (FIG. 7B) on the display unit 911 (step S110). Also, the MFP 300 notifies the user by means of a buzzer tone indicating that detailed settings are allowed (not shown). Note that upon detection of the duration of 2 sec, an elapse of time can be detected by a method of measuring a time using a timer of the MFP or by counting the number of polling commands. On the detailed setting screen shown in FIG. 7B, items such as a paper size, paper type, print quality, border setting, photo correction, red-eye correction, and the like, which are related to image print processing of the MFP 300, are arranged, and they can be respectively set by the user (not shown). Therefore, even when L size is designated as a default paper size, the user can designate 2L size. Then, the MFP 300 determines whether or not the user has completed the print settings on the screen displayed in step S110 are complete (step S111). If the user has completed various settings, he or she selects an OK button 701. In step S111, the MFP 300 detects whether or not this OK button 701 is selected. If selection of the OK button 701 is detected, the MFP 300 determines that the user has completed the print settings. After selection (touch) of this OK button 701 is detected, the MFP 300 receives, via the NFC unit 201, a file to be printed using a file path of the file to be printed included in the folder list received in step S109 so as to print image data sent from the mobile communication terminal 200 in step S104 (step S112). Then, the MFP 300 executes print processing according to the print settings (or print conditions) set by the user in step S111 (step S113) (second print control processing).

As described above, according to the first embodiment, when the user puts the mobile communication terminal 200 over the NFC unit 918 of the MFP 300 (he or she locates the terminal 200 to fall within the NFC communication range) while he or she operates the mobile communication terminal 200 to select an image file to be printed and inputs a print instruction, the mobile communication terminal 200 and MFP 300 exchange information required to establish BT communications via authentication using the NFC. After that, the BT communications are made to be ready to print the image file. In addition, the NFC communications are not required. The user is visually or audibly informed of such point (a point when a first stage is reached). Therefore, after the user confirms this point, even when he or she separates away from the NFC unit 918 of the MFP 300, the image file can be normally transmitted as long as the mobile communication terminal 200 is located within the communication range of the BT communications, and the user can obtain a printed matter. However, as for print settings in this case, print processing is executed according to default settings, which were made in advance on the MFP 300. On the other hand, when the user continuously puts the mobile communication terminal 200 over the NFC unit 918 of the MFP for a predetermined period of time (2 sec in this embodiment) or longer since the beginning of the BT communications, the MFP 300 determines that a second stage is reached, and automatically displays the screen related to detailed print settings on the display unit 911 of itself. Then, the MFP 300 waits for a setting completion instruction, and then executes print processing. Normally, since the MFP is literally a multi-function apparatus, a large number of setting menus are managed in a hierarchical structure. Therefore, the user has to make many operations until a detailed print setting menu is reached. In terms of this point, according to this embodiment, the user need only put the mobile communication terminal 200 over the NFC unit 918 of the MFP 300 and maintain this state for a predetermined period of time (2 sec in this embodiment) since the BT communications are established, thereby displaying the detailed print setting screen (menu) and greatly improving the operability.

Note that the aforementioned example has explained the sending example using the data sending method using a so-called PUSH type sending mode in which print processing is started by sending image data in the stage of step S104. However, the object of the present invention can also be achieved by a PULL type sending mode. At the beginning of the BT communications in step S104, image data information of data to be printed is sent. The image data information includes an image file name and path name information. When the user has moved the mobile communication terminal 200 to fall outside the NFC communication range since the MFP 300 determines in step S105 that the NFC communication duration is less than the threshold, a channel connection request for data reception is issued from the MFP side, and a reception request of image data required for print processing is issued according to the previously received image data information (PULL reception). When the NFC communication duration is equal to or larger than the threshold, a channel connection request for data reception is issued as in the case in which the user has immediately moved the mobile communication terminal 200 after detailed settings are complete, thus executing PULL reception of image data. Compared to the PUSH type mode, by executing the PULL type reception, image data to be printed can be acquired as needed, and a limitation on a reception buffer on the MFP side can be relaxed.

Second Embodiment

In the first embodiment, the user makes detailed print settings on the MFP 300. The second embodiment will explain a method of allowing the user to make detailed print settings on the mobile communication terminal 200 in detail below.

The user operation sequence of an image print application of the mobile communication terminal 200 will be described first with reference to display screen examples shown in FIGS. 5A to 5C and FIG. 11. When the application is launched, an image selection screen shown in FIG. 5A is displayed, thus allowing the user to select an image. When the user selects an image and selects a print start key 503, MFPs are searched for based on an inquiry request via the BT unit 202, and found MFPs are displayed on the display screen. A printer selection screen shown in FIG. 5B shows a display example of printers. The found MFPs are displayed on the display unit 203. On the other hand, simultaneously with the printer search via BT communications, an RF field is formed around the antenna of the NFC unit 201 to make NFC communications, and to search for an adjacent target. When the user locates (puts) the mobile communication terminal in the vicinity of (over) the NFC unit 918 of the MFP 300, the MFP which serves as a target is found. When the user separates the mobile communication terminal away from the MFP immediately after the target is found, BT communications are started to start data transmission, and print processing is started according to default print settings of the MFP. When the user continuously puts the mobile communication terminal 200 over the MFP 300 for a predetermined period of time (2 sec) or longer, the mobile communication terminal 200 acquires Capability information from the MFP 300 via NFC communications, and displays a detailed setting screen 1100 (see FIG. 11) on itself based on the acquired values. The user can change various print settings of the MFP 300 by operating a detailed setting area 1101 on the detailed setting screen 1100. When user touches a print start button 1102 after completion of the detailed settings, the settings and image data selected by the user are sent, and the MFP starts print processing. After the print processing is started, a print in progress screen shown in FIG. 5C is displayed.

An NFC communication protocol and BT communication protocol between the mobile communication terminal 200 and MFP 300 will be described in detail below with reference to the sequence chart shown in FIG. 12.

The mobile communication terminal 200 sends a polling command via NFC communications so as to search for a device to which an image is to be sent (step S1201). When the MFP 300 returns a response to the polling command (step S1202), the mobile communication terminal 200 judges that a target is found, and issues an NFC ID request including a self NFC ID (step S1203). The MFP 300 receives this request, and sends a self NFC ID as a response to the request (step S1204). The mobile communication terminal 200 and MFP 300 specify communication partners based on the received NFC IDs. After that, the mutual devices exchange keys to issue an authentication request (step S1205) and authentication response (step S1206), thus achieving mutual authentication and encrypting subsequent communications.

Next, the mobile communication terminal 200 issues a request of information associated with other available protocols to the MFP 300 (step S1207). Upon reception of this request, the MFP 300 returns information associated with other available protocols of itself (including BT communications) (step S1208). The mobile communication terminal 200 selects BT communications as a protocol suited to send image data based on the received protocol information. Next, the mobile communication terminal 200 issues a request of information associated with a Bluetooth Device Address (BD_ADDR), passkey, and link key required to establish a BT communication connection with the MFP 300 (step S1209), and receives information required to establish the BT communication connection as a response from the MFP 300 (step S1210). The mobile communication terminal 200 continuously sends a polling command a plurality of times via NFC communications (steps S1211 and S1213), and the MFP 300 returns a polling response (steps S1212 and S1214). The mobile communication terminal 200 measures a duration of the polling responses, and when it detects that the MFP 300 is located in the vicinity of itself (within the NFC communication range) for, for example, 2 sec or longer, the mobile communication terminal 200 issues a request of Capability information which describes function information of the MFP 300 via NFC communications (step S1215). Upon reception of this request, the MFP 300 sends Capability information (step S1216). FIG. 13A shows the Capability information request described in the XML format, and FIG. 13B shows an example of the Capability information. As shown in FIG. 13B, the Capability information includes information such as available paper sizes, paper types, and printable image formats. The mobile communication terminal 200 displays the detailed print setting screen on the display unit 810 of itself based on the received Capability information, thus allowing the user to make settings. When the user has completed the settings and touches the print start button, the mobile communication terminal 200 issues a BT connection request to the MFP 300 (step S1217), and the connection is established by a response from the MFP 300 (step S1218). Next, the mobile communication terminal 200 sends image data together with the selected setting information via the BT communication (step S1219). The MFP 300 returns a response (step S1220), and starts print processing based on the set information.

FIG. 14 is a flowchart showing the sequence of communication control processing of the mobile communication terminal 200 according to the second embodiment. The mobile communication terminal 200 begins to generate an RF field required to search for an adjacent target (step S1401), and waits for detection of the MFP 300 as a target (step S1402). After the target is detected, the mobile communication terminal 200 exchanges commands such as an ID request and authentication request via NFC communications (step S1403). Next, the mobile communication terminal 200 issues a request of available protocol information to the MFP 300, and acquires that information (step S1404). After the protocol information is obtained, the mobile communication terminal 200 notifies the user of the decision by means of a buzzer tone or the like since the control is ready to transit to BT communication (not shown). Then, the mobile communication terminal 200 continuously sends a polling command via the NFC communication to detect whether or not the MFP 300 is located in the vicinity of itself (step S1405). If a polling response ceases to be received before an elapse of a predetermined period of time (2 sec in this embodiment), the mobile communication terminal 200 begins to establish a BT communication connection with the MFP 300 based on the acquired protocol information, and sends image data in step S1410 (first transmission control processing). In this case, print processing is executed according to default print setting contents.

On the other hand, if the polling response duration of, for example, the predetermined period of time (2 sec) or longer is detected (step S1406), the mobile communication terminal 200 issues a request of function information (Capability information) of the MFP 300 to the MFP 300 via the NFC communications, and acquires that information (step S1407). If the information can be successfully acquired, the mobile communication terminal 200 notifies the user of that fact by means of a buzzer tone or the like, and displays the print setting screen on the operation screen based on the acquired Capability information (step S1408), thus allowing the user to make settings. If the user has completed the print settings and selects the print start button (step S1409), the mobile communication terminal 200 begins to establish a BT communication connection to the MFP 300 based on the decided protocol information, and the process advances to step S1410 to begin to send image data together with print setting information that describes the set print conditions (second transmission control processing).

As can be seen from the above description, in the second embodiment, an image flows from the mobile communication terminal 200 to the MFP 300 in the PUSH type mode. The mobile communication terminal 200 exchanges Capability information via the NFC communications, but the object of the present invention can also be achieved even when information may be exchanged using other communication protocol. In this embodiment, since the polling commands (steps S1211 and S1213) are issued to confirm if the mobile communication terminal is located in the vicinity of the MFP, the object of the present invention can also be achieved by sending other commands. Alternatively, the object of the present invention can also be achieved when the mobile communication terminal continuously forms an RF field without sending any command, and the MFP continuously detects the RF field. This embodiment has explained the sequence for sending image in a so-called PUSH type mode via the BT communications. Alternatively, the object of the present invention can also be achieved by a method in which data is acquired by establishing a link connection from the MFP side in a PULL type mode, a method of sending image data using other protocols such as a WLAN connection other than the BT communications, a method in which image data is saved in a server on the Internet, and the MFP receives URL information of image data to be printed and directly acquires image data from the server, and the like.

As described above, according to a printing system of the second embodiment as well, the processing operations of the mobile communication terminal can be selectively executed by different simple operations between a case in which the user wants to instruct to execute print processing using the default settings of the MFP from the mobile communication terminal and a case in which the user wants to make detailed settings.

Note that in the description of this embodiment, when NFC communications are established, pieces of information required for BT communications are exchanged to establish the BT communication. Alternatively, the communication control may transit to WLAN communications in place of the BT communications.

The description of the above embodiment has been given under the precondition that the mobile communication terminal is a smartphone. However, the type of a mobile terminal is not particularly limited as long as the mobile terminal has hardware associated with a plurality of communication units including a first communication unit that makes a short distance wireless communication and a second communication unit that is faster than the first communication unit and has a longer communication distance than the first communication unit. For example, a mobile phone, digital camera, PDA, portable PC, and the like may be used. Especially, in case of the smartphone, PDA, or PC, since an application program executed by its internal processor can implement the mobile communication terminal 200 described in the above embodiment, it is apparent that the scope of the present invention includes a computer program. Furthermore, since the computer program is normally stored in a computer-readable storage medium such as a CD-ROM, it is apparent that the scope of the present invention includes that computer-readable storage medium.

Note that the above embodiment has exemplified the case in which the MFP 300 receives print data stored in the mobile communication terminal 200 as print information. However, the present invention is not limited to this. For example, the MFP 300 may receive path information required to access data to be printed, which is stored in the MFP 300 or an external server, as print information from the mobile communication terminal 200, and may acquire the data to be printed according to that path information to execute print processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048617 filed Mar. 5, 2012, which is hereby incorporated by reference herein in its entirety.

What is claimed is:

1. A method for controlling an apparatus having a processor and a memory configured to implement the functions of a first wireless communication portion configured to execute first wireless communication by a first wireless communication method, and a second wireless communication portion configured to execute second wireless communication by a second wireless communication method having a communication range broader than that of the first wireless communication method, the method comprising:
    a display control step causing a display device to display a predetermined screen in which printing is instructed by a user, in a first case where the first wireless communication portion performs the first wireless communication with a printer and a predetermined condition is satisfied in the first wireless communication, and causing the display device to not display the predetermined screen, in a second case where the first communication portion performs the first wireless communication with the printer and the predetermined condition is not satisfied in the first wireless communication, and
    a transmitting step transmitting data to be printed by the printer, to the printer, using the second wireless communication which is established based on the first wireless communication,
    wherein, the data is transmitted in the transmitting step in the first case, in accordance with an instruction by the user to the display device displaying the predetermined screen in the display control step, and
    wherein the data is transmitted in the transmitting step in the second case, even if the instruction by the user is not performed on the display device.

2. The method in accordance with claim 1, wherein setting information required to establish the second wireless communication with the printer is received from the printer using the first wireless communication method, and
    the second wireless communication is established using the setting information.

3. The method in accordance with claim 1, wherein the predetermined screen is displayed at a stage in which the second communication portion can establish the second communication with the printer without the first communication.

4. The method in accordance with claim 1, wherein a screen for selecting an image to be printed, is displayed by the display device, and
    in the transmitting step, data corresponding to an image selected in the screen is transmitted to the printer using the second wireless communication.

5. The method in accordance with claim 1, wherein a print setting is indicated by the predetermined screen, and the data is printed by the printer, in accordance with the print setting indicated by the predetermined screen.

6. The method in accordance with claim 5, wherein in the display control step, a setting screen in which the print setting is changed, is displayed as the predetermined screen.

7. The method in accordance with claim 5, wherein in the transmitting step, the data and the print setting are transmitted to the printer.

8. The method in accordance with claim 5, wherein the print setting indicated by the predetermined screen, includes information relating to a paper size.

9. The method in accordance with claim 1, wherein the second wireless communication is established with the printer by the second wireless communication portion in the first case, in accordance with the instruction by the user to the predetermined screen displayed by the display device.

10. The method in accordance with claim 1, wherein the first wireless communication method is a near field communication (NFC).

11. The method in accordance with claim 10, wherein the first wireless communication portion of the apparatus operates as an initiator in the NFC, and the printer operates as a target in the NFC.

12. The method in accordance with claim 1, wherein the predetermined screen includes a display item for prompting a user to instruct printing.

13. The method in accordance with claim 1, wherein the display device is included in the apparatus.

14. The method in accordance with claim 13, wherein the display device is a touch panel.

15. The method in accordance with claim 14, wherein the apparatus is a smart phone.

16. The method in accordance with claim 1, wherein the second wireless communication method is a wireless LAN.

17. The method in accordance with claim 1, wherein the predetermined condition is that the first wireless communication is continued for not less than a predetermined period of time.

18. The method in accordance with claim 1, wherein the data is transmitted in the transmitting step in the second case, even if no instruction by the user is performed on the display device after the first wireless communication.

19. A non-transitory computer-readable storage medium storing a program which, in a case where read and executed by a computer, causes the computer to execute a method for controlling an apparatus having a processor and a memory configured to implement the functions of a first wireless communication portion configured to execute first wireless communication by a first wireless communication method, and a second wireless communication portion configured to execute second wireless communication by a second wireless communication method having a communication range broader than that of the first wireless communication method, the method comprising:

a display control step causing a display device to display a predetermined screen in which printing is instructed by a user, in a first case where the first wireless communication portion performs the first wireless communication with a printer and a predetermined condition is satisfied in the first wireless communication, and causing the display device to not display the predetermined screen, in a second case where the first communication portion performs the first wireless communication with the printer and the predetermined condition is not satisfied in the first wireless communication, and a transmitting step transmitting, by the processor, data to be printed by the printer, to the printer, using the second wireless communication which is established based on the first wireless communication, wherein the data is transmitted in the transmitting step in the first case, in accordance with an instruction by the user to the display device displaying the predetermined screen in the display control step, and wherein the data is transmitted in the transmitting step in the second case, even if the instruction by the user is not performed on the display device.

20. An apparatus comprising:

a processor and a memory configured to implement the functions of;

a first wireless communication portion; and a second wireless communication portion, wherein the first wireless communication portion executes first wireless communication by a first wireless communication method, and the second wireless communication portion executes second wireless communication by a second wireless communication method having a communication range broader than that of the first wireless communication method, the processor causes a display device to display a predetermined screen in which printing is instructed by a user, in a first case where the first wireless communication portion performs the first wireless communication with a printer and a predetermined condition is satisfied in the first wireless communication, and does not cause the display device to display the predetermined screen, in a second case where the first wireless communication portion performs the first wireless communication with the printer and the predetermined condition is not satisfied in the first wireless communication, and the processor transmits data to be printed by the printer, to the printer, using the second wireless communication which is established based on the first wireless communication, wherein, the data is transmitted in the first case, in accordance with an instruction by the user to the display device displaying the predetermined screen, and wherein, the data is transmitted in the second case, even if the instruction by the user is not performed on the display device.

* * * * *